United States Patent
Denuell et al.

(10) Patent No.: US 6,823,605 B2
(45) Date of Patent: Nov. 30, 2004

(54) CENTRIFUGE FOR MECHANICAL DRAINING AND THERMAL DRYING OF SLUDGES

(75) Inventors: Martin Denuell, Troisdorf (DE); Eberhard Koppe, Heidelberg (DE); Wallace Leung, Sherbon, MA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/381,087

(22) PCT Filed: Sep. 24, 2001

(86) PCT No.: PCT/EP01/11059

§ 371 (c)(1),
(2), (4) Date: Jun. 20, 2003

(87) PCT Pub. No.: WO02/24341

PCT Pub. Date: Mar. 28, 2002

(65) Prior Publication Data

US 2004/0035018 A1 Feb. 26, 2004

(30) Foreign Application Priority Data

Sep. 22, 2000 (DE) ......................................... 100 46 983

(51) Int. Cl.⁷ .................................................. F26B 5/08
(52) U.S. Cl. ............................. 34/59; 34/314; 34/369; 34/588
(58) Field of Search ............................. 34/231, 58, 59, 34/312–314, 318, 369, 498, 499, 582, 583, 588, 606, 185, 187; 210/374, 380.1, 380.3; 127/56, 54, 53, 37; 494/53, 54, 56, 37

(56) References Cited

U.S. PATENT DOCUMENTS

| | | | | |
|---|---|---|---|---|
| 3,123,557 A | * | 3/1964 | Mcphee et al. | 210/382 |
| 5,244,502 A | * | 9/1993 | Schaper et al. | 127/19 |
| 5,426,866 A | * | 6/1995 | Rumocki | 34/321 |
| 5,616,245 A | * | 4/1997 | Albrecht | 210/371 |
| 6,363,625 B1 | * | 4/2002 | Niemi | 34/136 |

FOREIGN PATENT DOCUMENTS

| | | |
|---|---|---|
| EP | 0979984 | 2/2000 |
| JP | 9264670 | 10/1997 |

* cited by examiner

Primary Examiner—Kenneth Rinehart
(74) Attorney, Agent, or Firm—B. Neil Sudol; Henry D. Coleman; William J. Sapone

(57) ABSTRACT

In order to create a solid-bow centrifuge for mechanical drainage and thermal drying of sludges, in which the possibility of clumping or of bake-on of the finely dispersed thick matter spun off from the thick matter outlet openings is minimized or prevented, according to the invention it is proposed to provide in the flight path of the spun off thick matter, a baffle cone surrounding the thick matter outlet openings at a distance and which rotates at a high circumferential velocity, that is, preferably it rotates together with the basket shell, and whose inner, ring-shaped, rotating conical surface accelerates the arriving thick matter and prevents solids bake-on.

8 Claims, 3 Drawing Sheets

CENTRIFUGE FOR MECHANICAL DRAINING AND THERMAL DRYING OF SLUDGES

BACKGROUND OF THE INVENTION

The invention pertains to a solid bowl centrifuge for separation of solid-liquid mixtures, with a liquid runoff located on one end region of the rotary-seated basket shell and with thick matter outlet openings located at the other end region of the basket shell, and with a centrifuge housing holding the spun off thick matter and having a flowing drying gas, whereby within the centrifuge housing in the flight path of the spun off thick matter, there is a baffle cone surrounding the thick matter output openings at a distance and diverting the thick matter.

The combined centrifugal drainage and thermal drying of clarified sludge in one compact structural unit having the configuration of a solid bowl worm-gear centrifuge is known, e.g., from WO-A-93/00562 and also from EP-A-0 979 984. The worm gear centrifuge is used as a dispersing unit for a directly outlet-connected convection dryer operated with hot gas or drying gas, in such a manner that the solids outlet housing and also the entire, standard housing of the centrifuge is exposed to the flowing, drying gas and is used as a flow dryer. Thus the drained thick matter spun off centrifugally from the thick matter outlet openings of the centrifugal basket is swirled up in dispersed form by the drying gas into spiral paths and is separated from the drying gas outside the centrifuge in a cyclone.

In the known centrifuges of the kind described above, within the centrifuge housing in the flight path of the spun off thick matter, there is a fixed baffle cone surrounding the thick matter outlet openings of the basket shell at a distance. This baffle cone is designed as a conical ring whose slant inclined, Inner conical surface is Intended to divert the impacting thick matter roughly into an axial direction, so that the spun off thick matter will not impact directly against the inner wall of the centrifuge housing. But it turns out that especially in the case of sludges tending to stick, the tiny thick matter particles spun off radially at high velocity, remain stuck to the conical surface of the fixed-site baffle cone and can form agglomerates, so that the drying process and the centrifuge operation is adversely affected, so it has previously been proposed to provide co-rotating cleaning blades or scratch plates outside at the basket shell of the centrifuge in the region of the thick matter outlet openings. Cleaning strips of these cleaning blades have a close proximity to the conical surface of the fixed-site baffle ring and are intended to scratch off the baked-on thick matter from the conical surface. Except for the fact that a design of this kind is structurally complicated and results in an additional energy requirement, the lumps of scratched off thick matter impede an efficient drying and they disrupt a dependable operation of the centrifuge.

SUMMARY OF THE INVENTION

The invention is based on the problem of creating a solid-bow centrifuge for mechanical draining and subsequent thermal drying of sludges, in which the possibility of lumping or bake-on of finely dispersed thick matter spun off from the thick matter outlet openings is minimized or eliminated.

This problem is solved in a solid-bow centrifuge with properties in accordance with the present invention.

In the invented centrifuge, the baffle cone located within the centrifuge housing in the flight path of the spun off, dispersed thick matter and surrounding the thick matter outlet openings of the basket shell at a distance, is not fixed stationarily in place, but rather it rotates during operation of the centrifuge. Thus, the baffle cone can be separately seated on a rotation bearing and can rotate at the same rotational velocity and with the same rotation direction as the basket shell, but also at a different rotational speed and even with an opposing rotational direction, where the rotational direction and the rotational velocity of the baffle cone are adapted to the existing requirements. For simplicity, the baffle cone is attached to the basket shell and it rotates with it at the same rotational speed. In contrast to the fixed baffle cone, the rotating baffle cone does not decelerate the thick matter spun off from the thick matter outlet openings of the basket shell upon impact on the conical surface, but rather the thick matter arrives upon a conical surface rotating with a correspondingly large circumferential velocity, where it is accelerated outward in a slanting direction or axially at a slant. Thus, the longitudinal velocity component of the thick matter which results from the breakdown of the radial velocity of the spun off thick matter into a normal component perpendicular to the conical surface of the baffle cone and into the conical longitudinal component, and which ultimately causes the fast migration of the thick matter in the direction of the large diameter of the rotating conical surface, is increased significantly, i.e., the rotating baffle cone, due to its self-cleaning effect, prevents thick matter bake-on and it distributes the spun off, diverted thick matter in disperse form uniformly into the drying space of the centrifuge with the flowing, drying gas.

According to an additional property of the invention, the conical surface of the co-rotating baffle cone has several profilings or vanes distributed about the perimeter, which run from the small conical diameter to the large conical diameter. These vanes guide the thick matter very quickly onto the conical surface of the baffle cone toward its large diameter or to the outer edge, so that the thick matter does not remain resting upon the conical surface. If the vanes are curved backward when viewed in the rotational direction of the baffle cone, then the possibility of eddy formation by the rotating vane and of additional energy loss will be minimized.

BRIEF DESCRIPTION OF THE DRAWINGS

The invention and its additional properties and advantages will be explained in greater detail below with reference to the design examples illustrated schematically in the figures. We have.

DETAILED DESCRIPTION OF PREFERRED EMBODIMENTS

Figure 1:
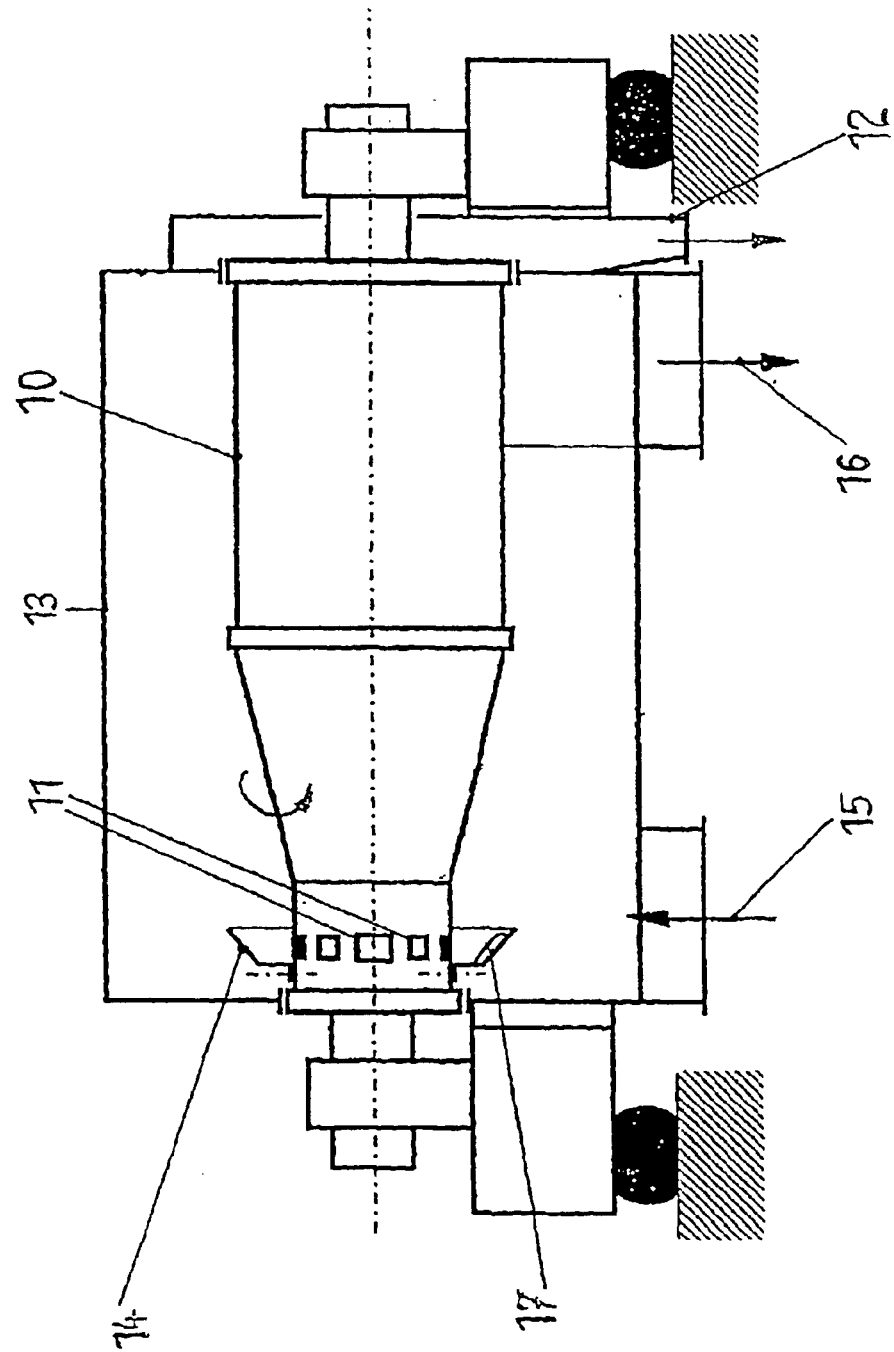
FIG. 1, the invented solid bow worm-gear centrifuge shown in longitudinal cross-section, partial front view, with the co-rotating baffle cone, FIG. 2a, the baffle cone shown enlarged.

The centrifuge of FIG. 1 has a rotary-seated cylindrical and conical basket shell 10, within which a coaxial conveyor worm gear (not illustrated) is rotary seated and which rotates in the basket at a different rotational speed. The solid-liquid mixture, such as clarified sludge, for example, to be thickened or to be drained, is inlet axially into the basket 10 via the worm gear element. During operation of the centrifuge, due to the effect of centrifugal force, a liquid ring forms within the basket 10 due to the effect of centrifugal force, and the heavy substances sedimented at the basket wall are transported to the left by means of the conveyor worm gear, lifted off from the conical basket shell section by the suspension liquid and moved by the conveyor worm gear to the solids outlet or thick matter outlet openings 11 distributed around the basket perimeter. The liquid cleaned of the solids runs off from the other end of the basket and is withdrawn through a liquid collection chamber 12 of the centrifuge housing 13.

The thick matter is spun off at a high velocity from the thick matter outlet openings 11 during operation of the centrifuge and is drained to a dry content (TS) of about 35%, for example. It arrives in finely dispersed form onto the slanting, dish-shaped conical surface of a baffle cone 14, which concentrically surrounds the thick matter outlet openings 11 at a distance and which co-rotates with the basket shell 10. The inner conical surface of the baffle cone 14 rotating at high circumferential velocity, which stays free of baked-on solids, diverts the thick matter spun off from the outlet openings 11, accelerates it in the direction of the large diameter baffle cone edge and distributes it uniformly into the hot gas stream 15, which enters tangentially into the centrifuge housing, thus picking up the dispersed thick matter and swirling it up in spiral paths in the annulus or drying chamber between the basket shell 10 and the centrifuge housing 13 and drying it. The drying gas stream 16 with the convectively dried thick matter suspended therein leaves the centrifuge at the other end. The separation of the solids dried in the drying gas stream to a dry weight of about 70%, for example, takes place outside of the centrifuge, for instance, in a cyclone separator.

The angle of the inner, ring-like conical surface of the baffle cone 14 mounted to the basket shell 10, to the axis of rotation can be essentially any value in a range from about 10° to about 80°. It has proven useful when this angle is coordinated to the circumferential speed of the baffle cone and is in a range from about 30° to 50°. It would also be possible to open the inner, ring-like conical surface of the baffle cone not to the right, but rather to the opposite side.

Figure 2A:
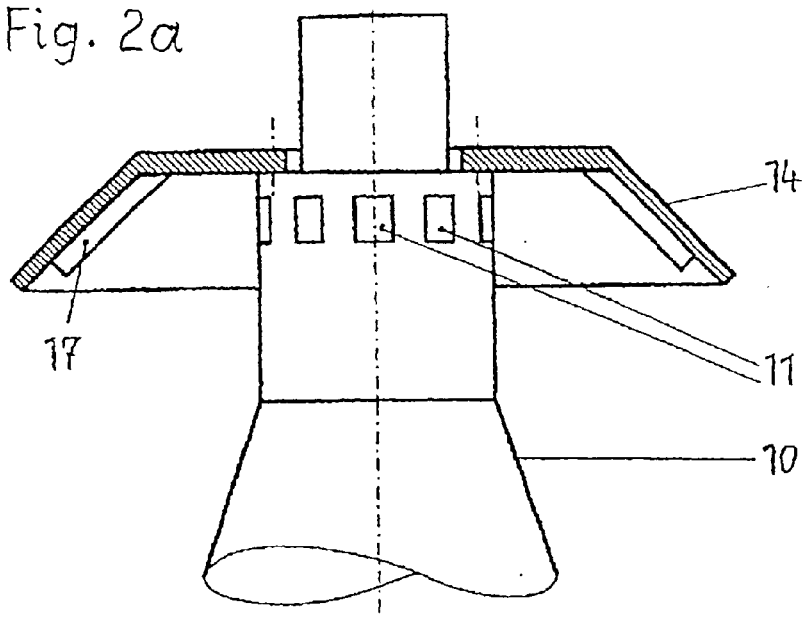
FIG. 2b: A top view of the co-rotating baffle cone, viewed from the right looking at the inward slanting, ring-shaped conical surface, and FIG. 3, sections of the longitudinal cross section through a different design format of the thick matter ejector end of the basket shell with co-rotating baffle cone and a housing separator wall cooperating with its periphery.
Figure 2B:
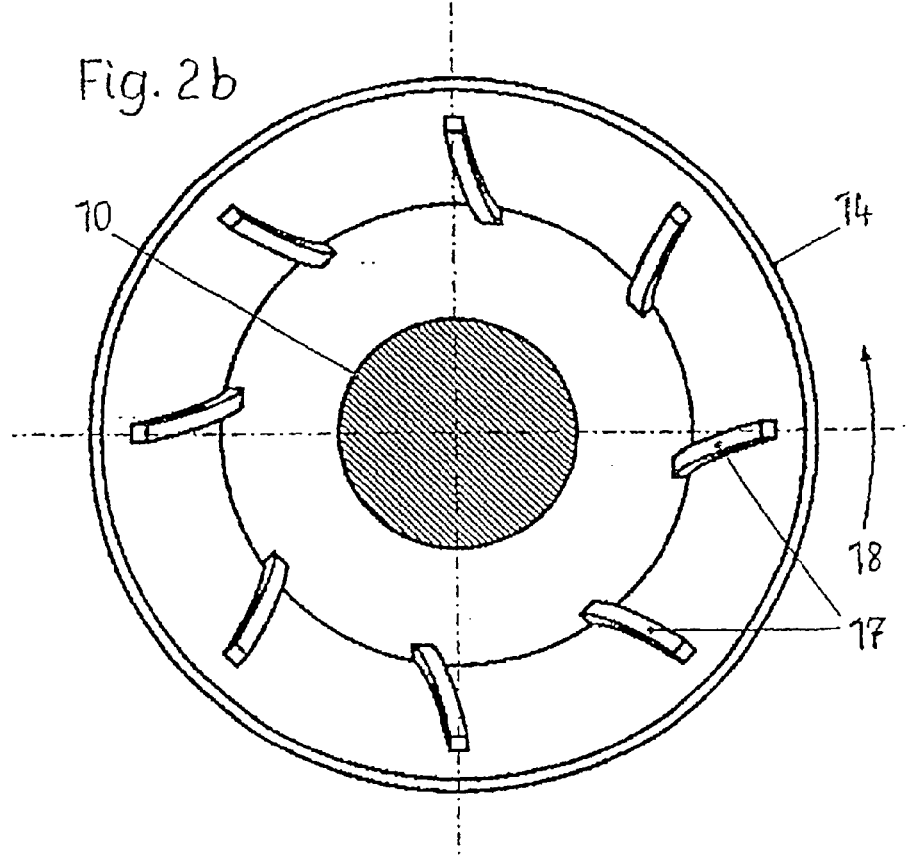

The inner conical surface of the rotating baffle cone 14 can have several, e.g., eight, profilings or vanes 17 distributed around the perimeter to guide and for shunting of the arriving thick matter. These vanes run from the small conical diameter to the large conical diameter and as is evident in the top view in FIG. 2b, they can be curved backward when viewed in the rotation direction 18 of the baffle cone 14, in order to minimize energy losses.

Figure 3:
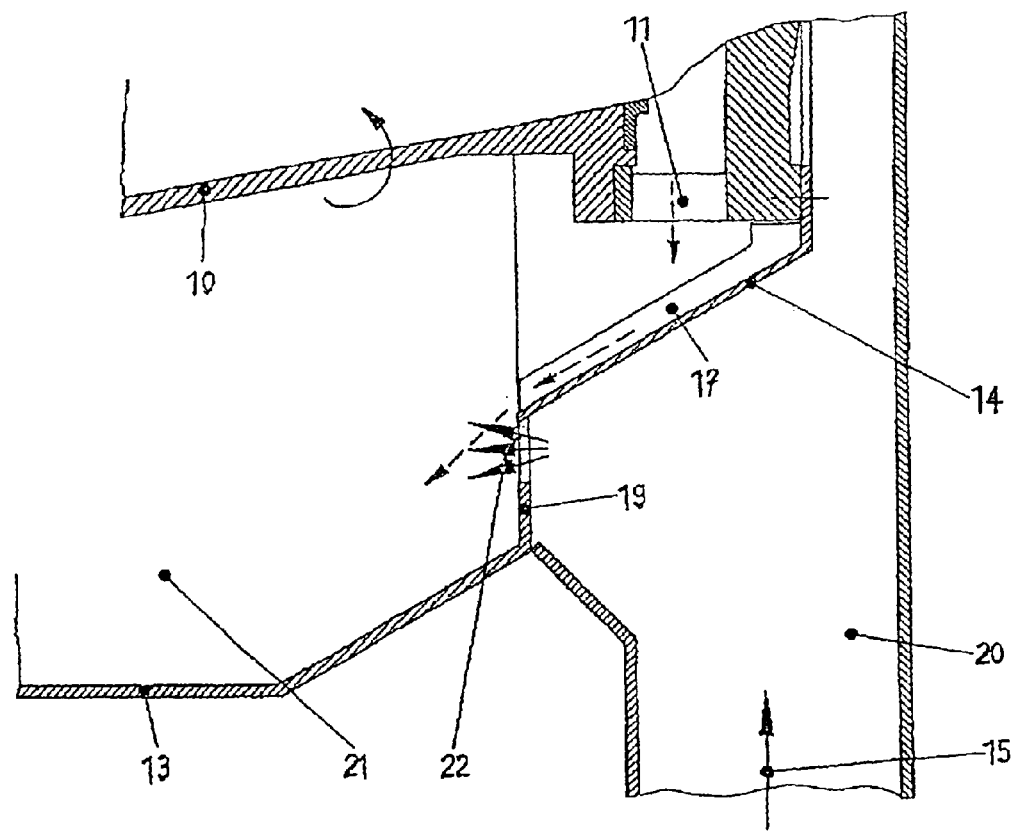

According to the design example in FIG. 3, within the centrifuge housing 13, in the vicinity of the large diameter of the rotating baffle cone 14, there can be a separating wall 19 surrounding the baffle cone at a distance; said wall separates the centrifuge housing 13 into a hot gas inlet chamber 20 and the adjoining drying area 21, so that a ring nozzle 22 forms between the large diameter of the rotating baffle cone 14 and the housing separating wall 19 for the outlet of the hot gas from the hot gas inlet chamber 20 into the drying area 21. Since the inner ring portion of the ring nozzle 22 rotates at a high circumferential velocity, a pressure gradient is induced so that the hot gas is suctioned from the hot gas inlet chamber 20 and is distributed uniformly across the perimeter of the ring nozzle 22, where it washes around the accelerated, dispersed thick matter particles arriving at the large conical diameter of the baffle cone 14, and the particles are efficiently dried in suspension as in a fluidized bed.

What is claimed is:

1. Solid-bowl centrifuge for separation of solid-liquid mixtures, with a liquid runoff located at one end region of a rotary-seated basket shell and with thick matter outlet openings located at another end region of the basket shell, and with a centrifuge housing holding spun off thick matter and having a flowing drying gas, wherein within a centrifuge housing in a flight path of the spun off thick matter there is a baffle cone surrounding the thick matter output openings at a distance and diverting the thick matter, the baffle cone being mounted for rotation during operation of the solid-bowl centrifuge, the baffle cone having an inner conical surface provided with several perimetrically distributed profilings or vanes extending from a small diameter to a large diameter of the baffle cone.

2. Centrifuge according to claim 1, wherein the baffle cone is attached to the basket shell and rotates with it at the same rotational velocity.

3. Centrifuge according to claim 2, wherein an angle of the inner conical surface of the baffle cone is in a range of about 10° to about 80° to an axis of rotation.

4. Centrifuge according to claim 1, wherein the vanes attached to the conical surface of the baffle cone are curved backward when viewed in the rotational direction of the baffle cone.

5. Centrifuge according to claim 1, wherein within the centrifuge housing in the region of the large diameter of the rotating baffle cone there is a separating wall surrounding said cone at a distance and which separates the centrifuge housing into a hot gas inlet chamber and an adjoining drying space, whereby between the large diameter of the rotating baffle cone and the separating wall, an annular nozzle is formed for the outlet of hot gas from the hot gas inlet chamber into the drying space.

6. Solid-bowl centrifuge for separation of solid-liquid mixtures, with a liquid runoff located at one end region of a rotary-seated basket shell and with thick matter outlet openings located at another end region of the basket shell, and with a centrifuge housing holding spun off thick matter and having a flowing drying gas, wherein within a centrifuge housing in a flight path of the spun off thick matter there is a baffle cone surrounding the thick matter output openings at a distance and diverting the thick matter, the baffle cone being mounted for rotation during operation of the solid-bowl centrifuge, a separating wall being provided within the centrifuge housing in the region of a large diameter of the rotating baffle cone, the separating wall surrounding said cone at a distance and separating the centrifuge housing into a hot gas inlet chamber and an adjoining drying space, an annular nozzle being formed between the large diameter of the rotating baffle cone and the separating wall for the outlet of hot gas from the hot gas inlet chamber into the drying space.

7. Centrifuge according to claim 6, wherein the baffle cone is attached to the basket shell and rotates with it at the same rotational velocity.

8. Centrifuge according to claim 7, wherein an angle of an inner conical surface of the baffle cone is in a range of about 10° to about 80° to an axis of rotation.

* * * * *